US012731070B2

(12) United States Patent
Lee et al.

(10) Patent No.: US 12,731,070 B2
(45) Date of Patent: Sep. 8, 2026

(54) APPARATUS AND METHOD OF TRAINING MACHINE LEARNING MODEL, AND APPARATUS AND METHOD FOR SUMMARIZING DOCUMENT USING THE SAME

(71) Applicant: SAMSUNG SDS CO., LTD., Seoul (KR)

(72) Inventors: Hyunjae Lee, Seoul (KR); Judong Kim, Seoul (KR); Hyunjin Choi, Seoul (KR); Bongkyu Hwang, Seoul (KR); Jaewoong Yun, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 996 days.

(21) Appl. No.: 17/968,193

(22) Filed: Oct. 18, 2022

(65) Prior Publication Data

US 2023/0131259 A1 Apr. 27, 2023

(30) Foreign Application Priority Data

Oct. 21, 2021 (KR) ........................ 10-2021-0140881

(51) Int. Cl.
*G06N 20/00* (2019.01)

(52) U.S. Cl.
CPC .................................... *G06N 20/00* (2019.01)

(58) Field of Classification Search
CPC ....................................................... G06N 20/00
See application file for complete search history.

(56) References Cited

U.S. PATENT DOCUMENTS 11,321,538 B1 * 5/2022 Fontecilla ............... G06F 40/30
11,748,571 B1 * 9/2023 Glavaš et al. ........ G06F 40/289 704/9
2019/0362713 A1 * 11/2019 Asi ......................... G06F 40/20
2020/0184016 A1 * 6/2020 Roller ..................... G06F 40/30

FOREIGN PATENT DOCUMENTS

KR 10-2020-0109914 A 9/2020

OTHER PUBLICATIONS

Logeswaran, L., Lee, H., & Radev, D. Sentence Ordering and Coherence Modeling using Recurrent Neural Networks. Proceedings of the AAAI Conference on Artificial Intelligence, 32(1). https://doi.org/10.1609/aaai.v32i1.11997 (Year: 2018).*

(Continued)

*Primary Examiner* — Barbara M Level
(74) *Attorney, Agent, or Firm* — Sughrue Mion, PLLC

(57) ABSTRACT

An apparatus of training a machine learning model includes a preprocessing module segmenting a document into each sentence and performing tokenization to generate a token sequence for the document, wherein a document representative token representing the document and representative sentence tokens representing each sentence are included in the token sequence for the document, a first training module training the machine learning model to predict an order of sentences in the document, based on the token sequence for the document, and a second training module training the (Continued)

machine learning model to perform document similarity maximization based on the token sequence for the document.

23 Claims, 9 Drawing Sheets

(56) References Cited

OTHER PUBLICATIONS

Logeswaran, L et al., ICLR 2017 Sentence Ordering Using Recurrent Neural Networks, Department of EECS University of Michigan Ann Arbor, MI 48109, USA {llajan,honglak,radev}@umich.edu (Year: 2017).*
Zou, Yanyan & Zhang, Xingxing & Lu, Wei & Wei, Furu & Zhou, Ming. (2020). STEP: Sequence-to-Sequence Transformer Pre-training for Document Summarization. 10.48550/arXiv.2004.01853. (Year: 2020).*
Shen et al., CN 112883722 B, filed Apr. 3, 2021, English translation. (Year: 2021).*
Q. A. Shreda and A. A. Hanani, "Identifying Non-Functional Requirements From Unconstrained Documents Using Natural Language Processing and Machine Learning Approaches," in IEEE Access, vol. 13, pp. 124159-124179, 2025, Published Jan. 19, 2021, doi: 10.1109/ACCESS.2021.3052921. (Year: 2021).*
Li, Yun-liang et al., CN 115293134 A, filed Aug. 11, 2022, A Sentence Ordering Method Based on Information Entropy, Device and Electronic Device (Year: 2022).*
Jing Ma, Input Order Shapes LLM Semantic Alignment in Multi-Document Summarization, University of Zurich, arXiv:2512.02665v1 [cs.CLS] Dec. 2, 2025. 11 pages. (Year: 2025).*
Cui, Bai-yun et al. CN 112307745 A, English translation, Relation-enhanced Sentence Sequencing Method Based On Bert Model, Published Feb. 2, 2021 (Year: 2021).*
Ma, Shuai et al., CN 114064885 A, filed Nov. 25, 2021, A Method for Extracting Abstract of Unsupervised Chinese Multi-document (Year: 2021).*
Communication issued May 6, 2026 by the Korean Ministry of Intellectual Property in Korean Patent Application No. 10-2021-0140881.
Liu, Yang et al., "Text Summarization with Pretrained Encoders", Proceedings of the 2019Conference on Empirical Methods in Natural Language Processing and the 9th International Joint Conference on Natural Language Processing, Nov. 3-7, 2019, pp. 3730-3740. (11 pages total).
Lan, Zhenzhong et al., "Albert: A Lite BERT for Self-Supervised Learning of Language Representations", arXiv: 1909.11942v6 [cs.CL], Feb. 9, 2020. (17 pages total).
Zheng, Chujie et al., "Enhanced Seq2Seq Autoencoder via Contrastive Learning for Abstractive Text Summarization", arXiv:2108.11992v1 [cs.CL] , Aug. 26, 2021. (12 pages total).

* cited by examiner

APPARATUS AND METHOD OF TRAINING MACHINE LEARNING MODEL, AND APPARATUS AND METHOD FOR SUMMARIZING DOCUMENT USING THE SAME

CROSS-REFERENCE TO RELATED APPLICATION AND CLAIM OF PRIORITY

This application claims the benefit under 35 USC § 119 of Korean Patent Application No. 10-2021-0140881 filed on Oct. 21, 2021 in the Korean Intellectual Property Office, the disclosure of which is incorporated herein by reference in its entirety.

BACKGROUND

1. Field

The present disclosure relates to a training technology of a machine learning model and a technology for summarizing a document using the same.

2. Description of Related Art

In computer science, natural language understanding (NLU) means that a computer receives a sentence formulated in a natural language (for example, Korean, Japanese, English, etc.) commonly used by humans for communication, and infers an intention of the input sentence. There are various technologies for understanding natural language on a computer, but recently, a technology using an artificial intelligence model based on machine learning has been mainly studied.

Among these artificial intelligence language models, an extractive summary task extracts important sentences from a document including several sentences. Existing extractive summary tasks mainly use a method of labeling in which a person directly writes a correct answer for most important sentences in a given document and then training a machine learning model using corresponding data set.

However, the existing method includes a subjectivity factor of the person (that is, annotator) labeling the correct answer, which not only causes bias in the data set itself but also extracts only sentences corresponding to a predetermined number of sentences when constructing the data set, and thus, it is difficult to train to flexibly select the number of important sentences. For example, in a dataset A, only the most important sentence is labeled as a correct answer, and if a machine learning model is trained with the dataset A, the machine learning model may extract only the most important sentence from input document and it may be difficult for the machine learning model to extract a second or third most important sentence from the document.

In addition, since most of the documents used as data sets are documents in which the most important sentences are not directly labeled as correct answers, it takes a lot of time and cost to train the machine learning model according to the existing method.

SUMMARY

Exemplary embodiments provide an apparatus and method of training a machine learning model, capable of extracting and summarizing various numbers of sentences from a document, while excluding a specific person's subjectivity factor in document summary, and an apparatus and method for summarizing a document using the same.

According to an aspect of the present disclosure, an apparatus of training a machine learning model, including: a preprocessing module segmenting a document into each sentence and performing tokenization to generate a token sequence for the document, wherein a document representative token representing the document and representative sentence tokens representing each sentence are included in the token sequence for the document; a first training module training the machine learning model to predict an order of sentences in the document, based on the token sequence for the document; and a second training module training the machine learning model to perform document similarity maximization based on the token sequence for the document.

The first training module may rearrange an order of the sentence token sequences and input the rearranged sentence token sequences to the machine learning model.

A representative sentence token for a corresponding sentence may be located at the front of the sentence token sequence, and the machine learning model may embed the representative sentence tokens in the rearranged sentence token sequences to generate embedding vectors, respectively, and predict the order of sentences in the document, based on the generated embedding vectors.

The first training module may calculate a first error by comparing a predicted sentence order output from the machine learning model with an original sentence order of the document and adjust a weight of the machine learning model to minimize the first error.

The second training module may input two documents that differ in the order of sentences to the machine learning model, and train the machine learning model so that a difference between the two documents is minimized.

The second training module may primarily rearrange the order of the sentence token sequences in the document, and input the primarily rearranged sentence token sequences and a first document representative token representing the primarily rearranged document to the machine learning model.

The second training module may secondarily rearrange the sentence token sequences in the document so that the order thereof is different from the order of the primary rearrangement, and input the secondarily rearranged sentence token sequences and a second document representative token representing the secondarily rearranged document to the machine learning model.

The machine learning model may embed the first document representative token to generate a first embedding vector, and embed the second document representative token to generate a second embedding vector.

The second training module may calculate a second error through a difference between the first embedding vector and the second embedding vector, and adjust a weight of the machine learning model to minimize the second error.

A loss function (Loss) of the machine learning model may be expressed by the following equation:

$$\text{Loss}=\text{Loss}_{SOP}+\alpha\cdot\text{Loss}_{DSM} \quad \text{(Equation)}$$

$\text{Loss}_{SOP}$: Loss function for sentence order prediction $\text{Loss}_{DSM}$: Loss function for document similarity maximization $\alpha$: normalization parameter According to another aspect of the present disclosure, a method of training a machine learning model includes: segmenting, by a preprocessing module, a document into each sentence and performing tokenization to generate a token sequence for the document, wherein a document representative token representing the document and representative sentence tokens representing each sentence are included in the token sequence for the document; training, with a first training module, the machine learning model to predict an order of sentences in the document, based on the token sequence for the document; and training, with a second training module, the machine learning model to perform document similarity maximization based on the token sequence for the document.

The training of the machine learning model to predict the order of sentences may include rearranging the order of the sentence token sequences in the document and inputting the rearranged sentence token sequences into the machine learning model, calculating a first error by comparing a predicted sentence order output from the machine learning model with an original sentence order of the document, and adjusting a weight of the machine learning model to minimize the first error.

A representative sentence token for a corresponding sentence may be located at the front of the sentence token sequence, and the machine learning model may embed the representative sentence tokens in the rearranged sentence token sequences to generate embedding vectors, respectively, and predict the order of sentences in the document, based on the generated embedding vectors.

The training of the machine learning model to perform document similarity maximization may include inputting two documents that differ in the order of sentences to the machine learning model and training the machine learning model so that a difference between the two documents is minimized.

The training of the machine learning model to perform document similarity maximization may include primarily rearranging the order of the sentence token sequences in the document, inputting the primarily rearranged sentence token sequences and a first document representative token representing the primarily rearranged document to the machine learning model, secondarily rearranging the sentence token sequences in the document so that the order thereof is different from the order of the primary rearrangement, and inputting the secondarily rearranged sentence token sequences and a second document representative token representing the secondarily rearranged document to the machine learning model.

The machine learning model may embed the first document representative token to generate a first embedding vector, and embed the second document representative token to generate a second embedding vector.

The training of the machine learning model to perform document similarity maximization may include calculating a second error through a difference between the first embedding vector and the second embedding vector and adjusting a weight of the machine learning model to minimize the second error.

A loss function (Loss) of the machine learning model may be expressed by the following equation:

$$\text{Loss}=\text{Loss}_{SOP}+\alpha\cdot\text{Loss}_{DSM} \quad \text{(Equation)}$$

$\text{Loss}_{SOP}$: Loss function for sentence order prediction $\text{Loss}_{DSM}$: Loss function for document similarity maximization $\alpha$: normalization parameter According to another aspect of the present disclosure, an apparatus for summarizing a document includes a preprocessing module segmenting a document into each sentence and performing tokenization to generate a token sequence for the document, wherein a document representative token representing the document and representative sentence tokens representing each sentence are included in the token sequence for the document, a machine learning module including a machine learning model receiving the token sequence for the document and embedding the document representative token and the representative sentence tokens of each sentence to output a document representative embedding vector and each representative sentence embedding vector, and a summary extracting module calculating a similarity between the document representative embedding vector and each representative sentence embedding vector and summarizing the document according to the calculated similarity.

The preprocessing module may locate the document representative token at the front of the document, and locate each representative sentence token at the front of a corresponding sentence.

The machine learning model may be trained to predict the order of sentences in the document based on a token sequence for the document, and may be trained to perform document similarity maximization based on the token sequence for the document.

The summary extracting module may summarize the document by extracting a sentence having the similarity greater than or equal to a preset threshold value.

According to another aspect of the present disclosure, a method for summarizing a document includes segmenting, by a preprocessing module, a document into each sentence and performing tokenization to generate a token sequence for the document, wherein a document representative token representing the document and representative sentence tokens representing each sentence are included in the token sequence for the document, receiving, by a machine learning module including a machine learning model, the token sequence for the document and embedding the document representative token and the representative sentence tokens of each sentence to output a document representative embedding vector and each representative sentence embedding vector, and calculating, by a summary extracting module, a similarity between the document representative embedding vector and each representative sentence embedding vector and summarizing the document according to the calculated similarity.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present disclosure are described with reference to the accompanying drawings. The following description is provided to aid in a comprehensive understanding of methods, devices, and/or systems disclosed in the particularities. However, the following description is merely exemplary and is not provided to limit the present disclosure.

In the following description of the present disclosure, a detailed description of known functions and configurations incorporated herein will be omitted when it would render the subject matter of the present disclosure unclear. The terms used in the present specification are defined in consideration of functions used in the present disclosure, and may be changed according to the intent or conventionally used methods of clients, operators, and users. Accordingly, definitions of the terms should be understood on the basis of the entire description of the present specification. Terms used in the following description are merely provided to describe exemplary embodiments of the present disclosure and are not intended to be limiting of the inventive concept. As used herein, the singular forms "a," "an" and "the" are intended to include the plural forms as well, unless the context clearly indicates otherwise. It will be further understood that the terms "comprises" or "has" when used in this specification, specify the presence of stated features, integers, steps, operations, elements, or portion or combination thereof, but do not preclude the presence or addition of one or more other features, integers, steps, operations, elements, or a portion or combination thereof.

It will be understood that, although the terms first, second, etc. May be used herein to describe various elements, these elements should not be limited by these terms. These terms are only used to distinguish one element from another. For example, a first element could be termed a second element, and, similarly, a second element could be termed a first element, without departing from the scope of the present disclosure.

Figure 1:
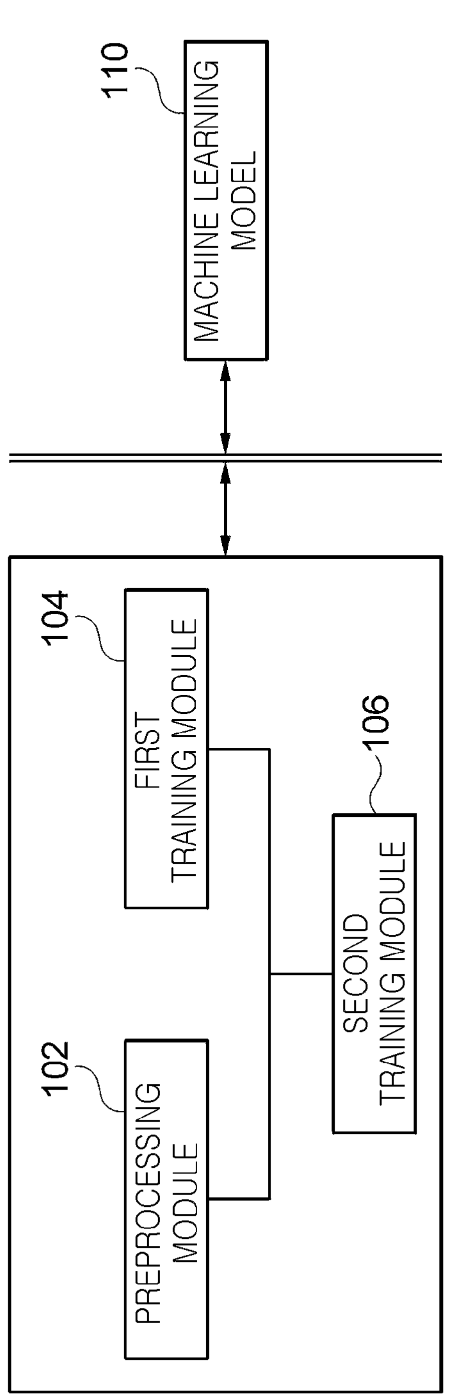
FIG. 1 is a block diagram illustrating an apparatus of training a machine learning model according to an exemplary embodiment in the present disclosure.

FIG. 1 is a block diagram illustrating an apparatus of training a machine learning model according to an exemplary embodiment in the present disclosure.

Referring to FIG. 1, an apparatus 100 of training a machine learning model may include a preprocessing module 102, a first training module 104, and a second training module 106.

Here, a machine learning model 110 is a model trained by the apparatus 100 and may be a model for performing an extractive summary task of extracting an important sentence from an input document. In an exemplary embodiment, as the machine learning model 110, an artificial neural network model such as long short term memory (LSTM), gated recurrent unit (GRU), bidirectional encoder representations from transformers (BERT), etc. may be used, but is not limited thereto.

The preprocessing module 102 may segment a document into each sentence, and perform tokenization on each sentence to generate tokens of a preset unit. For example, the preprocessing module 102 may generate tokens in units of morphemes by performing morpheme analysis on each sentence. Here, it is described that the preprocessing module 102 tokenizes each sentence in units of morphemes, but the present disclosure is not limited thereto, and tokenization may be performed in units of words or syllables, and tokenization may be performed in other preset units.

In this case, from the document, the preprocessing module 102 may extract a document representative token representing the corresponding document. Also, from each sentence, the preprocessing module 102 may extract a representative sentence token representing the corresponding sentence.

Figure 2:
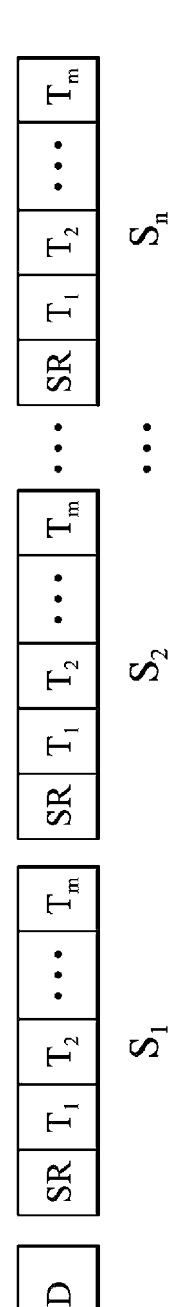
FIG. 2 is a diagram illustrating a state in which a preprocessing module performs tokenization on a document in an exemplary embodiment in the present disclosure.

FIG. 2 is a diagram illustrating a state in which the preprocessing module 102 performs tokenization on a document in an exemplary embodiment in the present disclosure. Referring to FIG. 2, the preprocessing module 102 may add a document representative token D at the front of a token sequence for a document (i.e., a token sequence for the entire document). The preprocessing module 102 may add a representative sentence token SR at the front of the token sequence for a corresponding sentence. Here, each sentence (S1, S2, . . . , Sn) (n is the number of sentences in the document) may include a representative sentence token SR and tokens (T1, T2, . . . , Tm) (where m is the number of tokens in the corresponding sentence).

The first training module 104 may serve to train the machine learning model 110 to predict the order of sentences in the document. That is, the first training module 104 may train the machine learning model 110 to perform a sentence order prediction (SOP) task.

Figure 3:
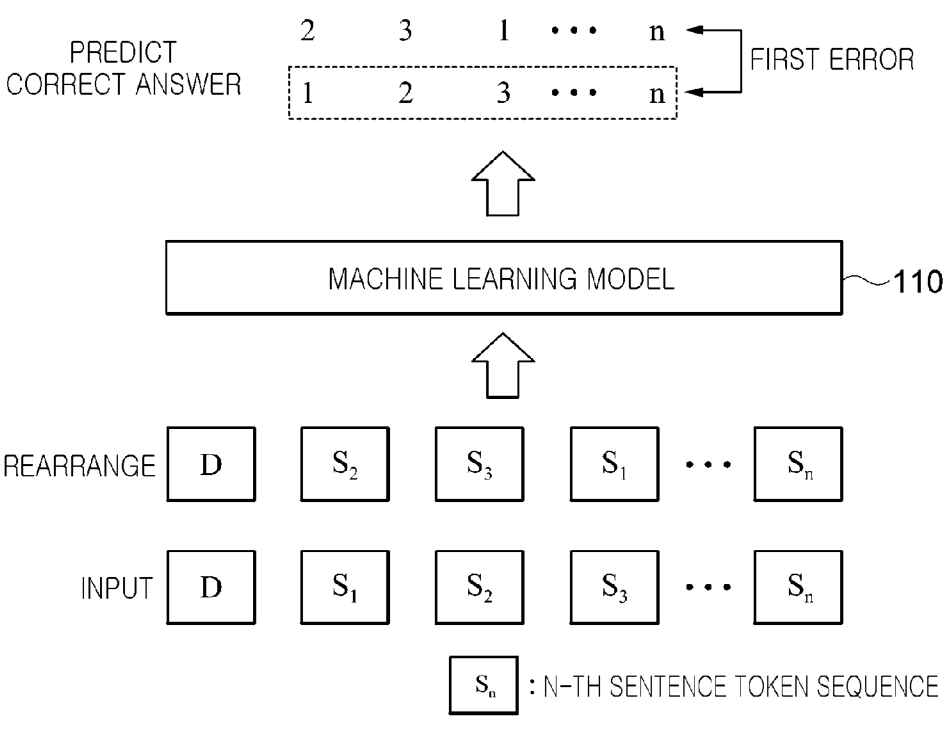
FIG. 3 is a diagram illustrating a state in which a first training module trains a machine learning model in an exemplary embodiment in the present disclosure.

FIG. 3 is a diagram illustrating a state in which the first training module 104 trains the machine learning model 110 in an exemplary embodiment in the present disclosure. Referring to FIG. 3, the first training module 104 may randomly change (rearrange) the order of sentences in a document and input the rearranged sentences to the machine learning model 110.

That is, the first training module 104 may randomly change the order of the token sequence (including the representative sentence token SR and the tokens T1, T2, . . . , Tm) for each sentence in the document. Hereinafter, a token sequence for a predetermined sentence may be referred to as a sentence token sequence. In this case, the first training module 104 may rearrange the order of the sentence token sequences in the document except for the document representative token D located at the front of the document.

The first training module 104 may input the rearranged sentence token sequences to the machine learning model 110. In this case, the first training module 104 may label the order of the sentences in the document in the original state before rearrangement as a correct answer value.

Here, the machine learning model 110 may embed the representative sentence token SR located at the front in the rearranged sentence token sequences to generate an embedding vector, and predict the order of the sentence token sequences in the document (i.e., the order of the sentences in the document) based on the generated embedding vectors. That is, in a state in which the order of the sentences in the document is randomly changed, the machine learning model 110 may be provided to predict the original order of the sentences in the document.

The first training module 104 may calculate a first error by comparing the order of the sentence token sequences in the document predicted by the machine learning model 110 (that is, the predicted sentence order) with the original order of the sentence token sequences in the document (that is, the original sentence order).

In an exemplary embodiment, the first training module 104 may calculate an error by comparing the predicted sentence order with the original sentence order and outputting whether the predicted sentence order is correct (True: 1) or incorrect (False: 0). In addition to such a binary classification method, the first training module 104 may use a multi-class classification method of obtaining an error by outputting an order from 0 to n−1 (where n is a total number of sentences in the document).

The first training module 104 may transmit the calculated first error to the machine learning model 110 to train the machine learning model 110 to minimize the first error. That is, the first training module 104 may adjust a weight or a parameter of an artificial neural network constituting the machine learning model 110 toward minimizing the first error.

Here, the machine learning model 110 is trained to predict the order of sentences in the document by the first training module 104, so that the machine learning model 110 may recognize flow of information in the document and a relationship between the sentences, thereby improving performance thereof when performing extractive summary task.

The second training module 106 may serve to train the machine learning model 110 so that a difference between two documents that differ only in the order of sentences is minimized (or similarity is maximized). That is, the second training module 106 may input two documents that differ in the order of sentences for one document to the machine learning model 110, and train the machine learning model 110 to minimize a difference between the two documents (in other words, similarity is maximized). The second training module 106 may train the machine learning model 110 to perform a document similarity maximization (DSM) task.

Figure 4:
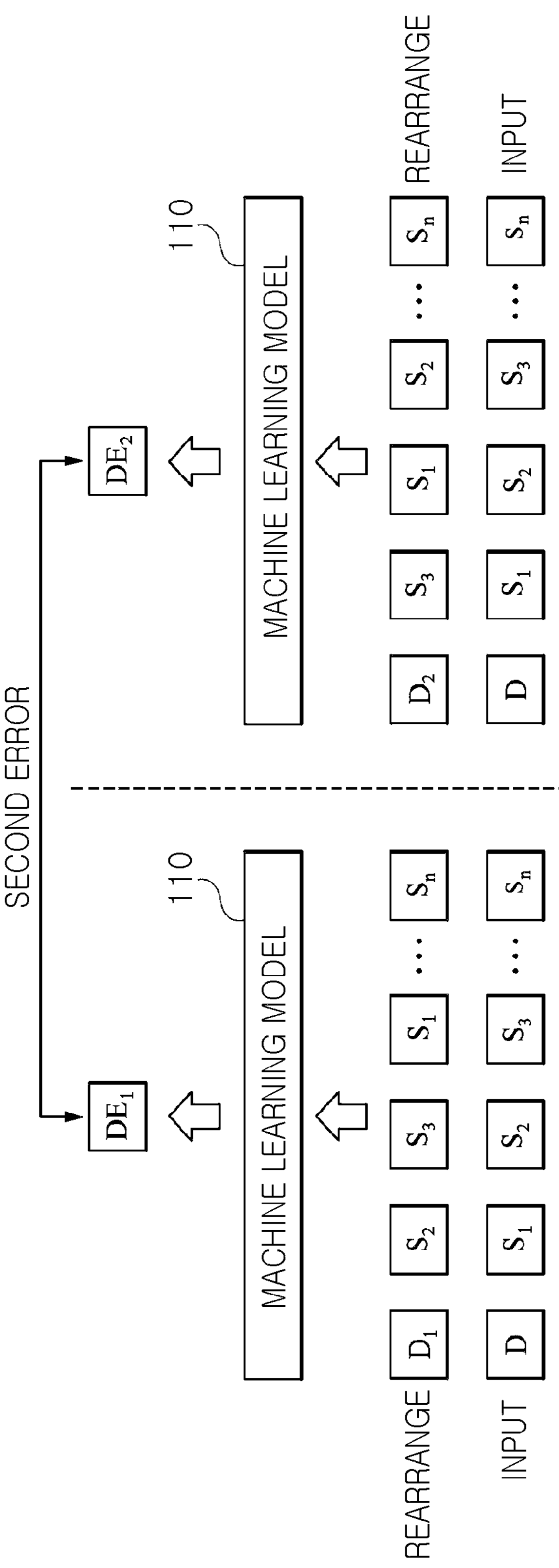
FIG. 4 is a diagram illustrating a state in which a second training module trains a machine learning model in an exemplary embodiment in the present disclosure.

FIG. 4 is a diagram illustrating a state in which the second training module 106 trains the machine learning model 110 in an exemplary embodiment in the present disclosure. Referring to FIG. 4, the second training module 106 may primarily rearrange the order of sentence token sequences with respect to the document tokenized by the preprocessing module 102 and input the rearranged sentence token sequences into the machine learning model 110. In this case, a first document representative token D1 representing the document in which sentence token sequences are primarily rearranged may be located at the front of the document.

In addition, the second training module 106 may secondarily rearrange the order of sentence token sequences with respect to the document tokenized by the preprocessing module 102 and input the rearranged sentence token sequences into the machine learning model 110. In this case, a second document representative token D2 representing the document in which sentence token sequences are secondarily rearranged may be located at the front of the document. Here, the order of the secondly rearranged sentence token sequences should be different from the order of the primarily rearranged sentence token sequences.

Here, the machine learning model 110 may embed the first document representative token D1 of the primarily rearranged document to generate a first embedding vector DE1. In addition, the machine learning model 110 may embed the second document representative token D2 of the secondly rearranged document to generate a second embedding vector DE2.

The second training module 106 may calculate a second error through a difference between the first embedding vector DE1 and the second embedding vector DE2 output by the machine learning model 110.

The second training module 106 may transmit the calculated second error to the machine learning model 110 to train the machine learning model 110 to minimize the second error. That is, the second training module 106 may adjust the weight or parameter of the artificial neural network constituting the machine learning model 110 toward minimizing the second error.

Meanwhile, here, it is described that a document in which the order of sentences is primarily rearranged and a document in which the order of sentences is secondarily rearranged are separately input to the machine learning model 110 to train the machine learning model 110, but the present disclosure is not limited thereto, and the machine learning model 110 may be trained by inputting a document in which some of the sentences of the document are rearranged and a document in which the rest of the sentences of the document are rearranged to the machine learning model 110. For example, when a document includes ten sentences, first to fifth sentences may be rearranged and input to the machine learning model 110 and sixth to tenth sentences may be rearranged and input to the machine learning model 110.

A loss function (Loss) of the machine learning model 110 trained by the first training module 104 and the second training module 106 may be expressed as Equation 1 below.

(Equation)

$$\text{Loss}=\text{Loss}_{SOP}+\alpha\cdot\text{Loss}_{DSM} \quad \text{(Equation 1)}$$

$\text{Loss}_{SOP}$: Loss function for sentence order prediction $\text{Loss}_{DSM}$: Loss function for document similarity maximization $\alpha$: normalization parameter Here, a may be a parameter for normalization of the loss function $\text{Loss}_{SOP}$ and the loss function $\text{Loss}_{DSM}$.

Figure 5:
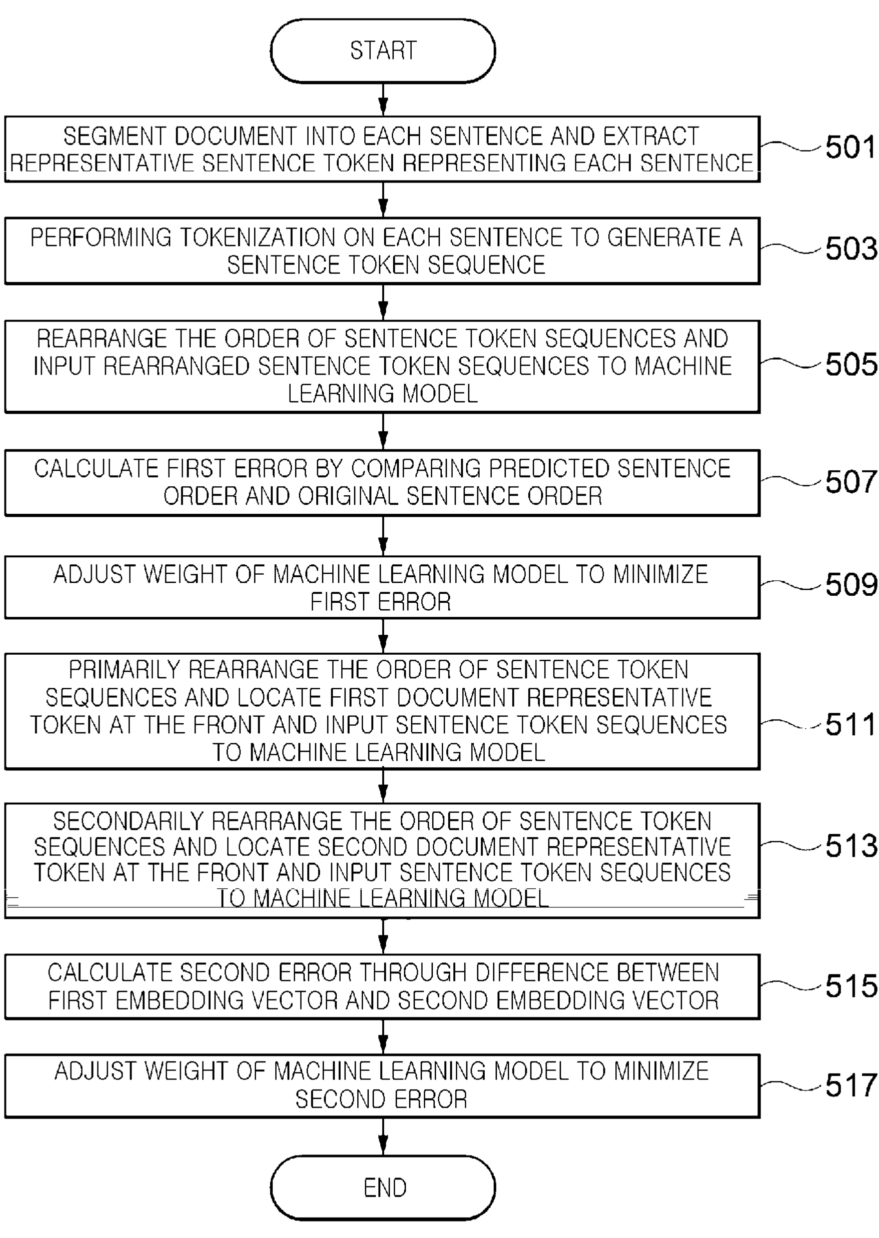
FIG. 5 is a flowchart illustrating a method of training a machine learning model according to an exemplary embodiment in the present disclosure.

FIG. 5 is a flowchart illustrating a method of training a machine learning model according to an exemplary embodiment in the present disclosure. The method illustrated in FIG. 5 may be performed, for example, by the training apparatus 100 illustrated in FIG. 1.

Referring to FIG. 5, the training apparatus 100 segments a document into each sentence and extracts a representative sentence token representing each sentence (501).

Thereafter, the training apparatus 100 tokenizes each sentence to generate a sentence token sequence (S503). In this case, the training apparatus 100 may locate a representative sentence token SR of the corresponding sentence at the front of the sentence token sequence of the corresponding sentence.

Thereafter, the training apparatus 100 rearranges the order of sentence token sequences in the document and inputs the rearranged sentence token sequences to the machine learning model 110 (505).

Thereafter, the training apparatus 100 calculates a first error for sentence order prediction by comparing a predicted sentence order output by the machine learning model 110 with an original sentence order (507).

At this time, the machine learning model 110 generates an embedding vector by embedding the representative sentence token SR located at the front in the rearranged sentence token sequences, and output a predicted sentence order (value predicting the order of sentences in the document) based on the generated embedding vectors.

Thereafter, the training apparatus 100 transmits the first error to the machine learning model 110 to adjust a weight of the machine learning model 110 toward minimizing the first error (509).

Thereafter, the training apparatus 100 first rearranges the order of the sentence token sequences in the document, locates a first document representative token D1 representing the primarily rearranged document at the front of the document, and input the same to the machine learning model 110 (511).

Thereafter, the training apparatus 100 secondarily rearranges the order of the sentence token sequences in the document, and locates a second document representative token D2 representing the secondly rearranged document at the front of the document, and input the same to the machine learning model 110 (513).

Thereafter, the training apparatus 100 calculates a second error through a difference between the first embedding vector DE1 and the second embedding vector DE2 output from the machine learning model 110 (515).

Here, the machine learning model 110 may generate the first embedding vector DE1 by embedding the first document representative token D1 of the primarily rearranged document and generate the second embedding vector DE2 by embedding the second document representative token D2 of the secondly rearranged document.

Thereafter, the training apparatus 100 transmits the second error to the machine learning model 110 to adjust a weight of the machine learning model 110 toward minimizing the second error (517).

Meanwhile, in the flowchart illustrated in FIG. 5, the method is described as being segmented into a plurality of operations, but at least some of the operations may be performed in a different order, may be performed in combination with other operations, may be omitted, or may be segmented into detailed operations to be performed, or one or more operations (not shown) may be added and performed.

Figure 6:
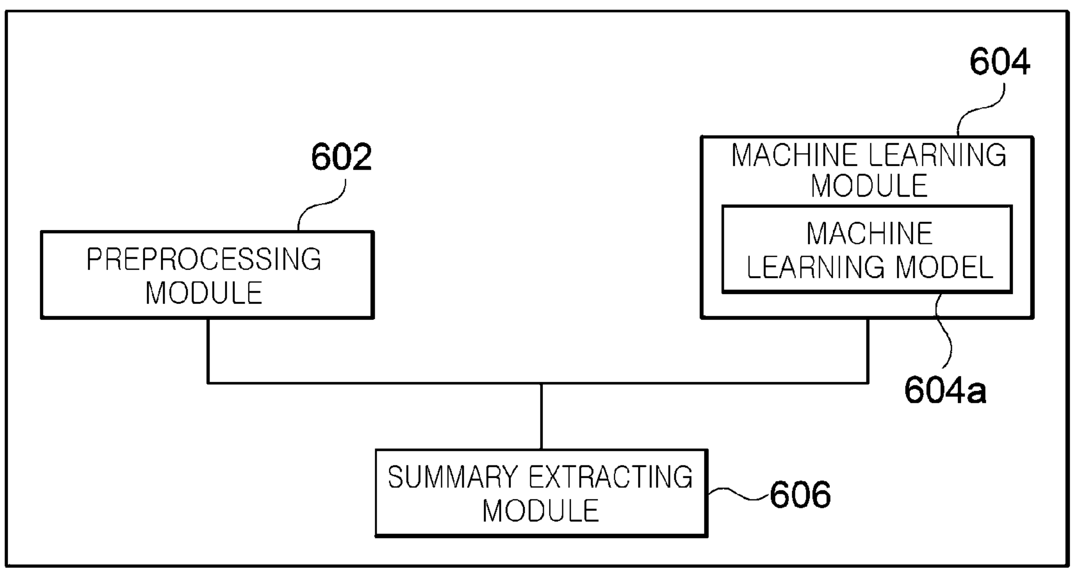
FIG. 6 is a block diagram illustrating a configuration of an apparatus for summarizing a document according to an exemplary embodiment in the present disclosure.
Figure 7:
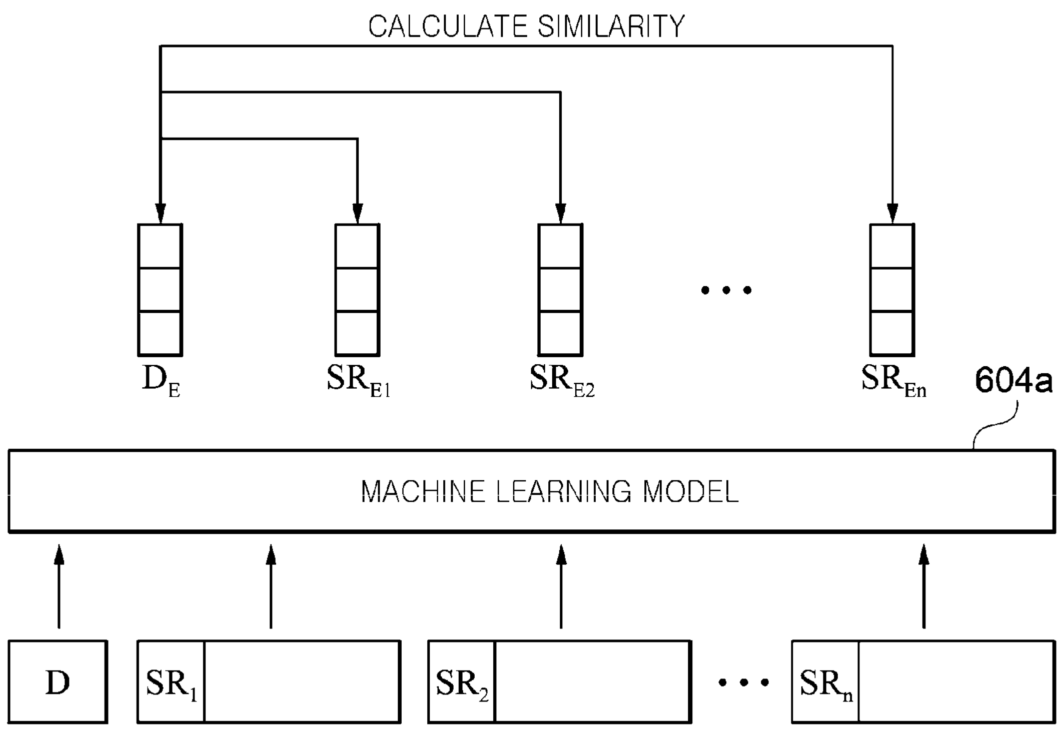
FIG. 7 is a diagram illustrating a process of summarizing a document by an apparatus according to an exemplary embodiment in the present disclosure.

FIG. 6 is a block diagram illustrating a configuration of an apparatus for summarizing a document according to an exemplary embodiment in the present disclosure, and FIG. 7 is a diagram illustrating a process of summarizing a document in the apparatus for summarizing a document according to an exemplary embodiment in the present disclosure.

Referring to FIGS. 6 and 7, an apparatus 600 for a document may include a preprocessing module 602, a machine learning module 604, and a summary extracting module 606.

The preprocessing module 602 may segment an input document into each sentence and perform tokenization on each sentence. The preprocessing module 602 may extract a document representative token representing the corresponding document from the document, and may extract a representative sentence token representing the corresponding sentence from each sentence. The preprocessing module 602 may locate the document representative token D at the front of the document and may locate the representative sentence token SR at the front of the corresponding sentence, and may input the same to the machine learning module 604.

The machine learning module 604 may include a machine learning model 604*a* for performing extractive summary task. The machine learning model 604*a* may be a model trained according to the exemplary embodiments illustrated in FIGS. 1 to 5.

The machine learning model 604*a* may embed the input document representative token D and output the document representative embedding vector $D_E$. The machine learning model 604*a* may embed the representative sentence token SR in each input sentence token sequence and output representative sentence embedding vectors $SR_{E1}$, $SR_{E2}$, $SR_{E3}$, . . . , $SR_{En}$.

The summary extracting module 606 may calculate a similarity between the document representative embedding vector $D_E$ and each of the representative sentence embedding vectors $SR_{E1}$, $SR_{E2}$, $SR_{E3}$, . . . , $SR_{En}$. The summary extracting module 606 may extract a sentence in which the calculated similarity is equal to or greater than a preset threshold value to summarize the corresponding document.

That is, the machine learning model 604*a* is trained to include information in the document well when generating the document representative embedding vector $D_E$ through self-supervised learning and is trained to properly adjust the order of the sentences in the document when generating the representative sentence embedding vectors $SR_{E1}$, $SR_{E2}$, $SR_{E3}$, . . . , $SR_{En}$, so that a representative sentence embedding vector most similar to the document representative embedding vector DE may have a high probability of properly reflecting the whole information of the corresponding document. Accordingly, the summary extracting module 606 extracts a sentence having a calculated similarity equal to or greater than a preset threshold value to summarize the corresponding document.

In this case, the number of extracted sentences may be adjusted according to a preset threshold value. That is, as the preset threshold value is higher, the number of sentences extracted from the document is reduced. Here, a non-fixed number of sentences may be extracted from the document by using the threshold value, and the top N sentences may be extracted in a ranking method.

According to the disclosed exemplary embodiment, the machine learning model may be trained to predict the order of sentences in a document and minimize a difference between two documents that differ only in sentence order, so that the machine learning model may extract an important sentence even for a document with no correct answers, may exclude a subjectivity factor of a specific person when summarizing the document, and may summarize the document by extracting various numbers of sentences from the document. Also, the time and cost required to train the machine learning model may be reduced.

In this specification, a module may refer to a functional and structural combination of hardware for carrying out the technical idea of the present disclosure and software for driving the hardware. For example, the “module” may refer to a logical unit of a predetermined code and a hardware resource for executing the predetermined code, and may not refer to a physically connected code or one type of hardware.

Figure 8:
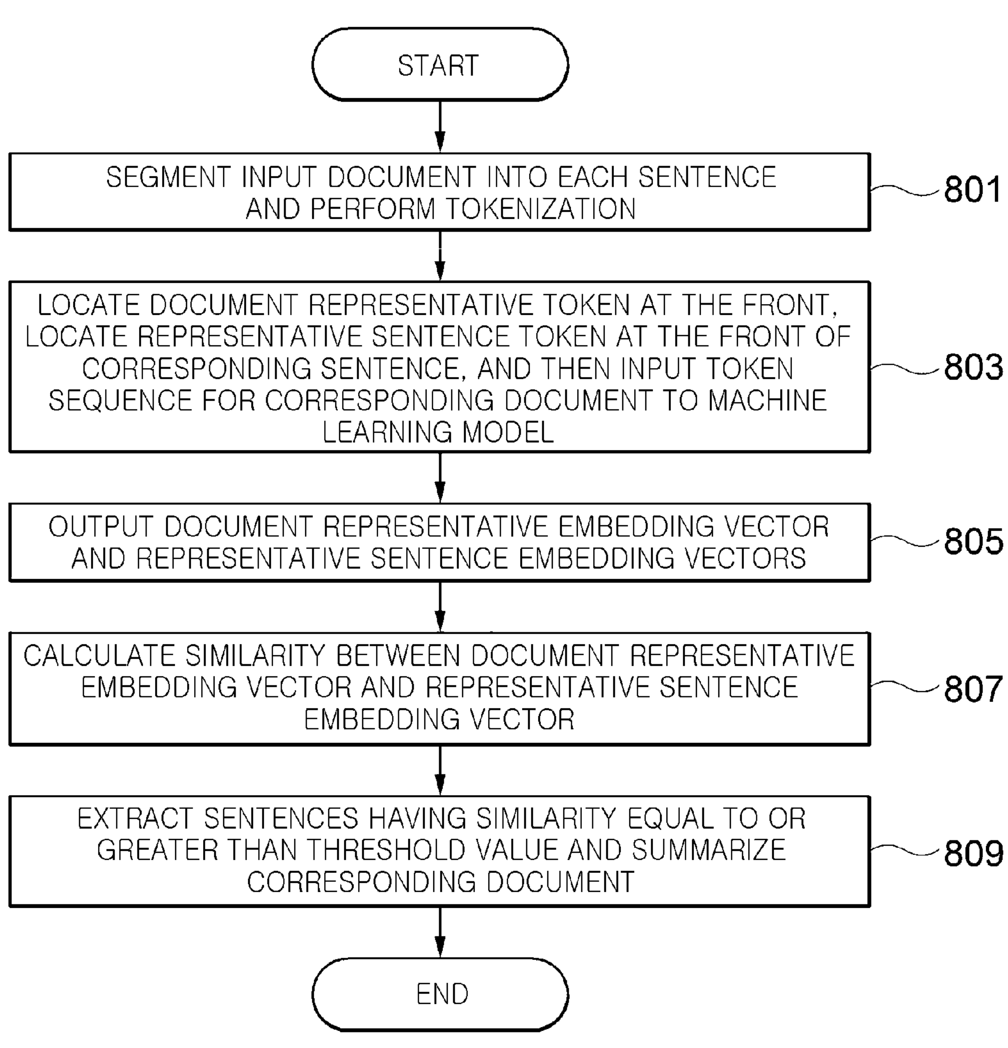
FIG. 8 is a flowchart illustrating a method for summarizing a document based on machine learning according to an exemplary embodiment in the present disclosure.

FIG. 8 is a flowchart illustrating a method for summarizing a document based on machine learning according to an exemplary embodiment in the present disclosure. The method illustrated in FIG. 8 may be performed, for example, by the apparatus 600 for summarizing a document of FIG. 6.

Referring to FIG. 8, the apparatus 600 for summarizing a document segments an input document into sentences and then performs tokenization (801). Here, the apparatus 600 for summarizing a document extracts a document representative token from the document, and extracts a representative sentence token representing the corresponding sentence from each sentence.

Thereafter, the apparatus 600 for summarizing a document locates the document representative token at the front of the document, locates the representative sentence tokens at the front of the corresponding sentence, and inputs a token sequence for the corresponding document into the machine learning model 604*a* (803).

Thereafter, the apparatus 600 for summarizing a document outputs a document representative embedding vector in which the document representative token is embedded through the machine learning model 604*a*, and outputs the representative sentence embedding vectors in which each representative sentence token is embedded (805).

Thereafter, the apparatus 600 for summarizing a document calculates a similarity between the document representative embedding vector and each representative sentence embedding vector (807).

Thereafter, the apparatus 600 for summarizing a document extracts sentences having the calculated similarity equal to or greater than a preset threshold value and summarizes the corresponding document (S809).

Figure 9:
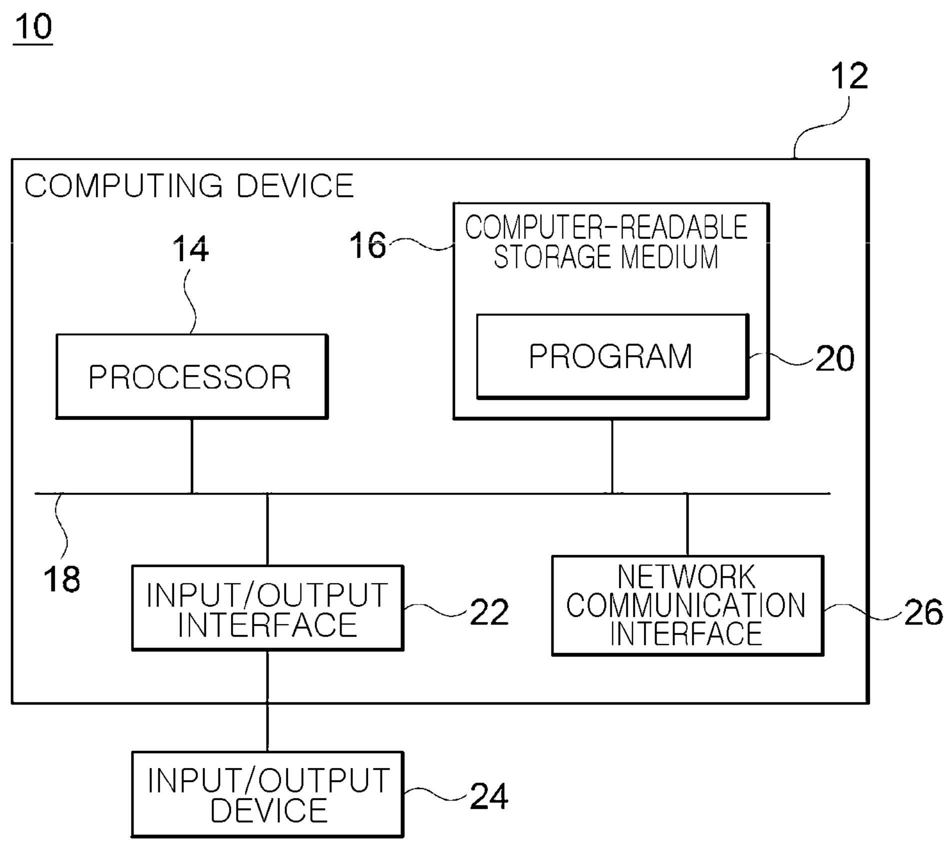
FIG. 9 is a block diagram illustrating a computing environment including a computing device suitable for use in exemplary embodiments.

FIG. 9 is a block diagram illustrating a computing environment 10 including a computing device suitable for use in exemplary embodiments. In the illustrated exemplary embodiment, each component may have different functions and capabilities other than those described below, and may include additional components in addition to those described below.

The illustrated computing environment 10 includes a computing device 12. In an exemplary embodiment, the computing device 12 may be a training apparatus 100 of a machine learning model. In addition, the computing device 12 may be an apparatus 600 for summarizing a document.

The computing device 12 includes at least one processor 14, a computer-readable storage medium 16, and a communication bus 18. The processor 14 may cause the computing device 12 to operate according to the exemplary embodiments described above. For example, the processor 14 may execute one or more programs stored in the computer-readable storage medium 16. The one or more programs may include one or more computer-executable instructions that, when executed by the processor 14, causes the computing device 12 to perform operations according to the exemplary embodiment.

The computer-readable storage medium 16 is configured to store computer-executable instructions or program code, program data, and/or other suitable form of information. The program 20 stored in the computer-readable storage medium 16 includes a set of instructions executable by the processor 14. In an exemplary embodiment, the computer-readable storage medium 16 includes a memory (a volatile memory, such as random access memory, a non-volatile memory, or suitable combinations thereof), one or more magnetic disk storage devices, optical disk storage devices, flash memory devices, other forms of storage mediums that may be accessed by computing device 12 and store desired information, or suitable combinations thereof.

The communication bus 18 interconnects various other components of computing device 12, including the processor 14 and the computer-readable storage medium 16.

The computing device 12 may also include one or more input/output (I/O) interfaces 22 providing interfaces for one or more I/O devices 24 and one or more network communication interfaces 26. The I/O interface 22 and the network communication interface 26 are connected to the communication bus 18. The I/O device 24 may be connected to other components of the computing device 12 via the I/O interface 22. The I/O device 24 may include input devices such as pointing devices (such as computer mouses or trackpads), keyboards, touch input devices (such as touchpads or touchscreens), voice or sound input devices, various types of sensor devices, and/or imaging devices and/or output devices, such as display devices, printers, speakers, and/or network cards. The I/O device 24 may be included in the computing device 12, as a component constituting the computing device 12, and may be connected to the computing device 12, as a separate device distinct from the computing device 12.

According to the exemplary embodiments, the machine learning model is trained to predict the order of sentences in a document and minimize a difference between two documents that differ only in sentence order, so that ab important sentence may be extracted even for a document with no correct answers, and when summarizing a document, a subjectivity factor of a specific person may be excluded and a various number of sentences may be extracted from the document to summarize the document. In addition, the time and cost required to train the machine learning model may be reduced.

While exemplary embodiments have been illustrated and described above, it will be apparent to those skilled in the art that modifications and variations could be made without departing from the scope of the present disclosure as defined by the appended claims.

What is claimed is:

1. An apparatus of training a machine learning model, the apparatus comprising:

a processor;

a memory storing one or more programs, wherein the processor is configured to execute the one or more programs to perform preprocessing, first training, and second training, wherein the preprocessing comprises segmenting a document into sentences and perform tokenization to generate a token sequence for the document, the token sequence including a document representative token representing the document and representative sentence tokens representing the sentences, respectively;

wherein the first training comprises training the machine learning model to predict an order of the sentences in the document, based on the token sequence for the document; and wherein the second training comprises training the machine learning model to perform document similarity maximization in which a similarity between two documents that differ only in the order of sentences is maximized, the two documents being generated by rearranging the order of the token sequence for the document.

2. The apparatus of claim 1, wherein the preprocessing comprises tokenizing the sentences to generate sentence token sequences; and the first training comprises rearranging an order of the sentence token sequences and inputting the rearranged sentence token sequences to the machine learning model.

3. The apparatus of claim 2, wherein a representative sentence token for a corresponding sentence is located at the front of a sentence token sequence, and the machine learning model embeds the representative sentence tokens in the rearranged sentence token sequences to generate embedding vectors, respectively, and predicts the order of the sentences in the document, based on the generated embedding vectors.

4. The apparatus of claim 3, wherein the first training comprises calculating a first error by comparing a predicted sentence order output from the machine learning model with an original sentence order of the document and adjusting a weight of the machine learning model to minimize the first error.

5. The apparatus of claim 1, wherein the second training comprises inputting two documents that differ in the order of sentences to the machine learning model, and training the machine learning model so that a difference between the two documents is minimized.

6. The apparatus of claim 5, wherein the second training comprises performing first rearranging of the order of the sentence token sequences in the document according to a first order, and inputting the first rearranged sentence token sequences according to the first order and a first document representative token representing the first rearranged document to the machine learning model.

7. The apparatus of claim 6, wherein the second training comprises:

performing second rearranging of the sentence token sequences in the document according to a second order so that the order of the second rearranged sentence token sequences is different from the order of the first rearranged sentence token sequences; and input the second rearranged sentence token sequences and a second document representative token representing the second rearranged document to the machine learning model.

8. The apparatus of claim 7, wherein the machine learning model is configured to embed the first document representative token to generate a first embedding vector, and embed the second document representative token to generate a second embedding vector.

9. The apparatus of claim 8, wherein the second training comprises calculating a second error through a difference between the first embedding vector and the second embedding vector, and adjusting a weight of the machine learning model to minimize the second error.

10. The apparatus of claim 1, wherein a loss function (Loss) of the machine learning model is expressed by the following equation:

$$\text{Loss}=\text{Loss}_{SOP}+\alpha\cdot\text{Loss}_{DSM} \quad \text{[Equation]}$$

$\text{Loss}_{SOP}$ is a loss function for sentence order prediction;

$\text{Loss}_{DSM}$ is a loss function for document similarity maximization; and $\alpha$ is a normalization parameter.

11. A method of training a machine learning model, the method performed by an apparatus comprising a processor, and a memory storing one or more programs configured to be executed by the processor, the method comprising:

segmenting a document into sentences and performing tokenization to generate a token sequence for the document, the token sequence including a document representative token representing the document and representative sentence tokens representing the sentences, respectively;

training the machine learning model to predict an order of sentences in the document, based on the token sequence for the document; and training the machine learning model to perform document similarity maximization in which a similarity between two documents that differ only in the order of sentences is maximized, the two documents being generated by rearranging the order of the token sequence for the document.

12. The method of claim 11, further comprising: tokenizing the sentences to generate sentence token sequences, wherein the training of the machine learning model to predict the order of sentences includes:

rearranging the order of the sentence token sequences in the document and inputting the rearranged sentence token sequences into the machine learning model;

calculating a first error by comparing a predicted sentence order output from the machine learning model with an original sentence order of the document; and adjusting a weight of the machine learning model to minimize the first error.

13. The method of claim 12, wherein representative sentence token for a corresponding sentence is located at the front of the sentence token sequence, and the machine learning model embeds the representative sentence tokens in the rearranged sentence token sequences to generate embedding vectors, respectively, and predicts the order of the sentences in the document, based on the generated embedding vectors.

14. The method of claim 11, wherein the training of the machine learning model to perform document similarity maximization includes:

inputting two documents that differ in the order of sentences to the machine learning model; and training the machine learning model so that a difference between the two documents is minimized.

15. The method of claim 14, wherein the training of the machine learning model to perform document similarity maximization includes:

performing a first rearranging of the order of the sentence token sequences in the document according to a first order;

inputting the first rearranged sentence token sequences and a first document representative token representing the first rearranged document to the machine learning model;

performing a second rearranging of the sentence token sequences in the document according to a second order so that the order of the second rearranged sentence token sequences is different from the order of the first rearranged sentence token sequences; and inputting the second rearranged sentence token sequences and a second document representative token representing the second rearranged document to the machine learning model.

16. The method of claim 15, wherein the machine learning model embeds the first document representative token to generate a first embedding vector, and embeds the second document representative token to generate a second embedding vector.

17. The method of claim 16, wherein the training of the machine learning model to perform document similarity maximization includes:

calculating a second error through a difference between the first embedding vector and the second embedding vector; and adjusting a weight of the machine learning model to minimize the second error.

18. The method of claim 11, wherein a loss function (Loss) of the machine learning model is expressed by the following equation:

$$\text{Loss}=\text{Loss}_{SOP}+\alpha\cdot\text{Loss}_{DSM} \quad \text{[Equation]}$$

$Loss_{SOP}$ is a loss function for sentence order prediction;

$Loss_{DSM}$ is a loss function for document similarity maximization; and $\alpha$ is a normalization parameter.

19. An apparatus for summarizing a document using a machine learning model that is trained by the method of claim 11, the apparatus comprising:

a processor;

a memory storing one or more programs configured to be executed by the processor to implement processing, the machine learning model, and summary extracting, wherein the preprocessing comprises segmenting a document into sentences and perform tokenization to generate a token sequence for the document, the token sequence including a document representative token representing the document and representative sentence tokens representing the sentences, respectively;

wherein the machine learning model is configured to receive the token sequence for the document and embed the document representative token and the representative sentence tokens to output a document representative embedding vector and representative sentence embedding vectors; and wherein the summary extracting comprises calculating a similarity between the document representative embedding vector and each representative sentence embedding vector and summarize the document according to the calculated similarity.

20. The apparatus of claim 19, wherein the preprocessing comprises locating the document representative token at a front of the document, and locate each representative sentence token at a front of a corresponding sentence.

21. The apparatus of claim 20, wherein the machine learning model is configured to be trained to predict an order of the sentences in the document based on the token sequence for the document, and to be trained to perform document similarity maximization, in which a similarity between two documents that differ only in the order of sentences is maximized, the two documents being generated by rearranging the order of the token sequence for the document.

22. The apparatus of claim 21, wherein the summary extracting comprises summarizing the document by extracting a sentence having the similarity greater than or equal to a preset threshold value.

23. A method for summarizing a document using a machine learning model that is trained by the method of claim 11, the method performed by an apparatus comprising a processor, and a memory storing one or more programs configured to be executed by the processor, the method comprising:

segmenting a document into sentences and performing tokenization to generate a token sequence for the document, the token sentence including a document representative token representing the document and representative sentence tokens representing the sentences, respectively;

receiving, using the machine learning model, the token sequence for the document and embedding the document representative token and the representative sentence tokens to output a document representative embedding vector and representative sentence embedding vectors; and calculating a similarity between the document representative embedding vector and each representative sentence embedding vector and summarizing the document according to the calculated similarity.

* * * * *